(12) United States Patent
Parikh et al.

(10) Patent No.: US 10,649,864 B1
(45) Date of Patent: May 12, 2020

(54) FRAMEWORK TO FACILITATE TAKING SNAPSHOTS OF WEB APPLICATION ON DEMAND

(71) Applicant: Veritas Technologies LLC, Mountain View, CA (US)

(72) Inventors: Mirang Dipak Parikh, Pune (IN); Rashmi Vijayvargiya, Pune (IN)

(73) Assignee: Veritas Technologies LLC, Santa Clara, CA (US)

( * ) Notice: Subject to any disclaimer, the term of this patent is extended or adjusted under 35 U.S.C. 154(b) by 326 days.

(21) Appl. No.: 15/474,779

(22) Filed: Mar. 30, 2017

(51) Int. Cl.
*G06F 16/00* (2019.01)
*G06F 11/14* (2006.01)

(52) U.S. Cl.
CPC ...... *G06F 11/1471* (2013.01); *G06F 11/1474* (2013.01); *G06F 2201/80* (2013.01); *G06F 2201/805* (2013.01); *G06F 2201/82* (2013.01)

(58) Field of Classification Search
CPC ............ G06F 11/1471; G06F 11/1474; G06F 2201/80; G06F 2201/805; G06F 2201/82
USPC .................................................. 707/649, 679
See application file for complete search history.

(56) References Cited

U.S. PATENT DOCUMENTS

| | | | | |
|---|---|---|---|---|
| 6,046,747 A * | 4/2000 | Saunders | ................. | G06T 15/10 345/522 |
| 7,263,662 B1 * | 8/2007 | Ballard | ................... | G06F 3/023 707/999.102 |
| 7,299,403 B1 * | 11/2007 | Cleasby | ............... | H04L 12/1822 715/738 |
| 8,079,037 B2 * | 12/2011 | Lui | ...................... | G06F 11/3636 719/310 |
| 8,127,000 B2 * | 2/2012 | Wenig | ................. | G06F 11/3438 709/224 |
| 8,468,502 B2 * | 6/2013 | Lui | ...................... | G06F 11/3636 717/125 |
| 8,949,266 B2 * | 2/2015 | Phillips | ................... | G10L 15/30 707/769 |
| 9,489,375 B2 * | 11/2016 | Koll | ...................... | G10L 15/063 |
| 10,062,375 B2 * | 8/2018 | Koll | .................... | G06F 3/04817 |
| 10,325,589 B2 * | 6/2019 | Koll | ...................... | G10L 15/063 |
| 2003/0195963 A1 * | 10/2003 | Song | ........................ | G06F 16/95 709/227 |
| 2005/0066037 A1 * | 3/2005 | Song | ....................... | G06F 16/95 709/227 |
| 2005/0102396 A1 * | 5/2005 | Hipp | ..................... | G06F 9/4843 709/224 |
| 2007/0083813 A1 * | 4/2007 | Lui | ...................... | G06F 11/3612 715/709 |

(Continued)

*Primary Examiner* — Hanh B Thai
(74) *Attorney, Agent, or Firm* — Campbell Stephenson LLP

(57) ABSTRACT

Various systems and methods are provided for capturing and storing state information and other data being used by a web application. For example, one method involves capturing the data and state information from a web application either on demand, on schedule, or on the occurrence of an event; storing the captured information in a persistent memory; subsequent to a closing of the web application, receiving an indication that the web application has been re-opened; presenting one or more options to a user, whereby the user can select a previous version to which the web application should be restored; and using the captured information to restore the web application data and user interface to a state indicated by the selected version.

20 Claims, 8 Drawing Sheets

(56) References Cited

U.S. PATENT DOCUMENTS

| | | | | |
|---|---|---|---|---|
| 2008/0005793 A1* | 1/2008 | Wenig | .................. | G06F 11/3438 |
| | | | | 726/22 |
| 2009/0265706 A1* | 10/2009 | Golosovker | .......... | G06F 9/4856 |
| | | | | 718/1 |
| 2012/0066378 A1* | 3/2012 | Lui | ..................... | G06F 11/3612 |
| | | | | 709/224 |
| 2012/0323557 A1* | 12/2012 | Koll | ...................... | G10L 15/063 |
| | | | | 704/8 |
| 2013/0329262 A1* | 12/2013 | Yamane | ............. | H04N 1/00832 |
| | | | | 358/448 |
| 2014/0095821 A1* | 4/2014 | Yang | ........................ | G06F 21/53 |
| | | | | 711/162 |
| 2015/0200829 A1* | 7/2015 | Dubroy | ................... | H04L 67/22 |
| | | | | 709/224 |
| 2015/0286511 A1* | 10/2015 | Mickens | ................. | G06F 9/544 |
| | | | | 719/320 |
| 2015/0317491 A1* | 11/2015 | Yang | ........................ | G06F 21/53 |
| | | | | 726/26 |
| 2016/0248924 A1* | 8/2016 | Yamane | ............. | H04N 1/00832 |
| 2017/0047061 A1* | 2/2017 | Koll | ...................... | G10L 15/183 |
| 2018/0261207 A1* | 9/2018 | Koll | ...................... | G10L 15/183 |

* cited by examiner

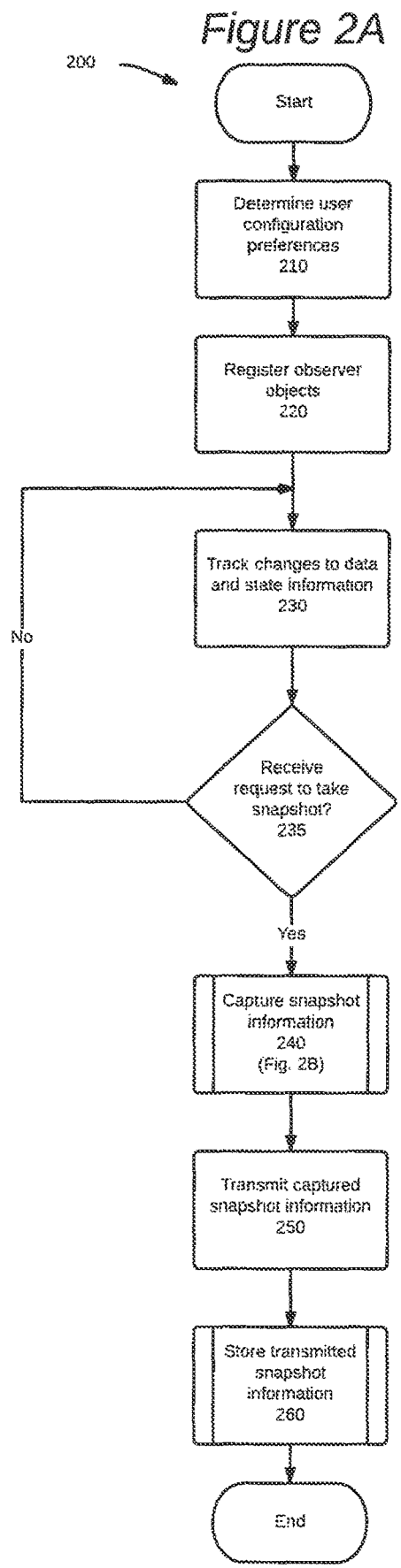

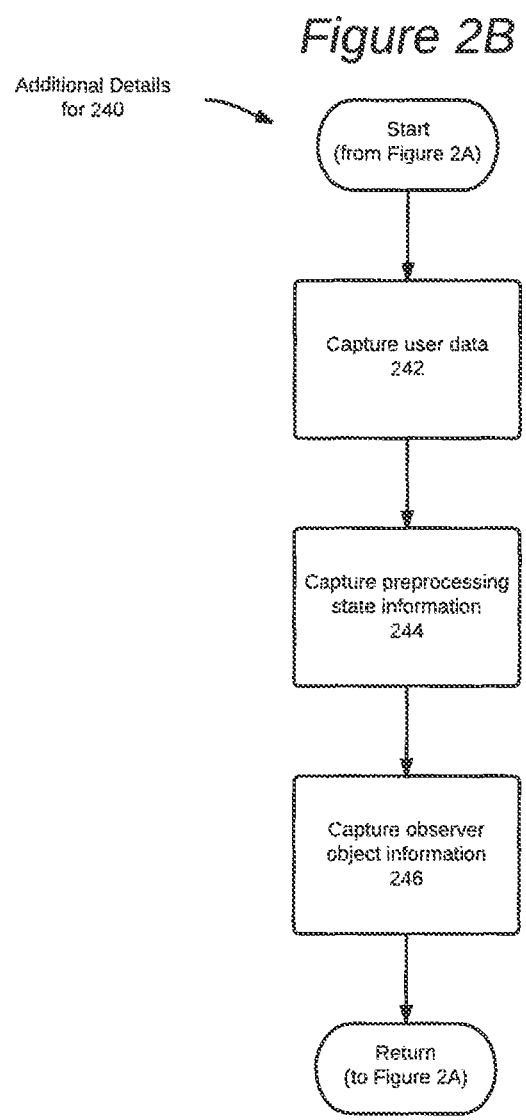

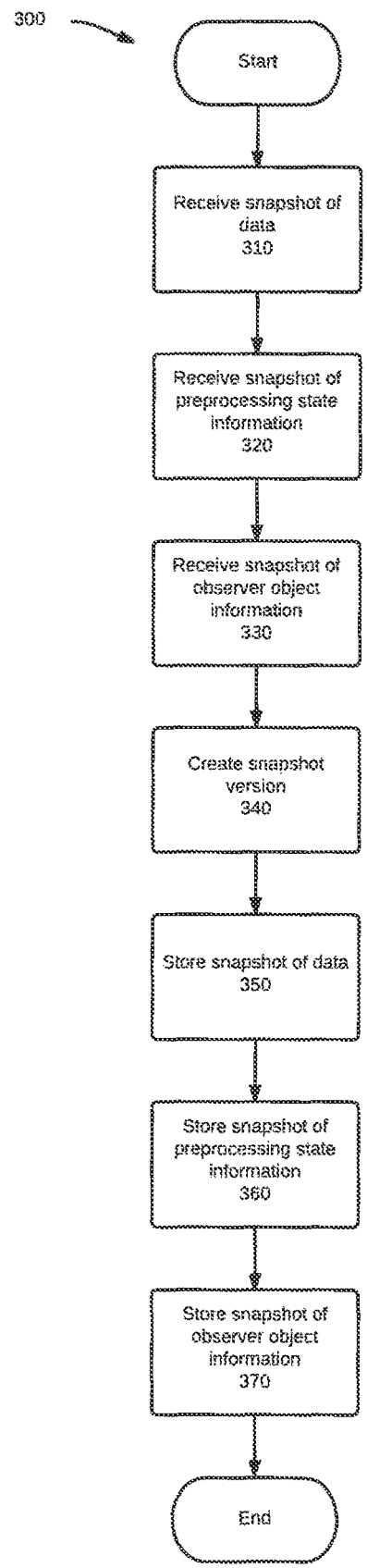

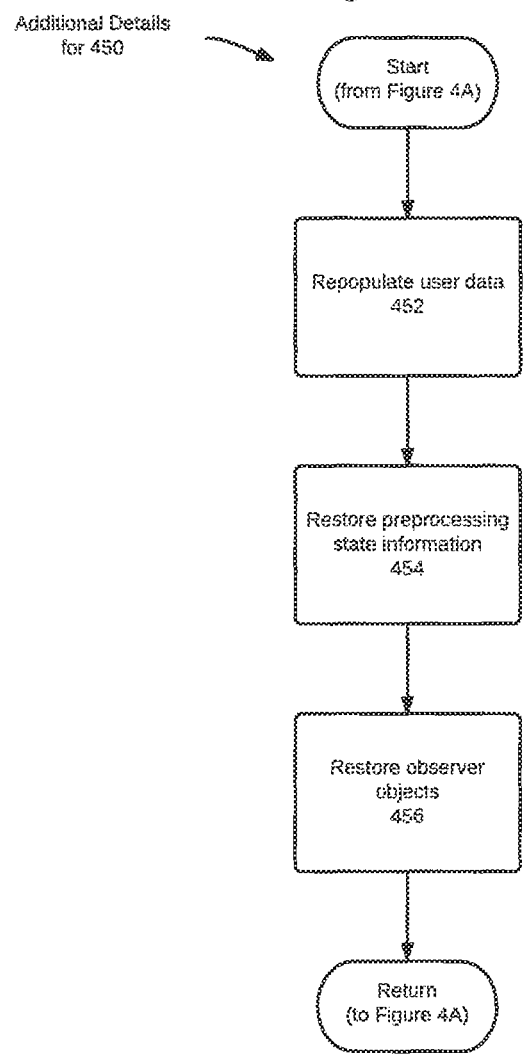

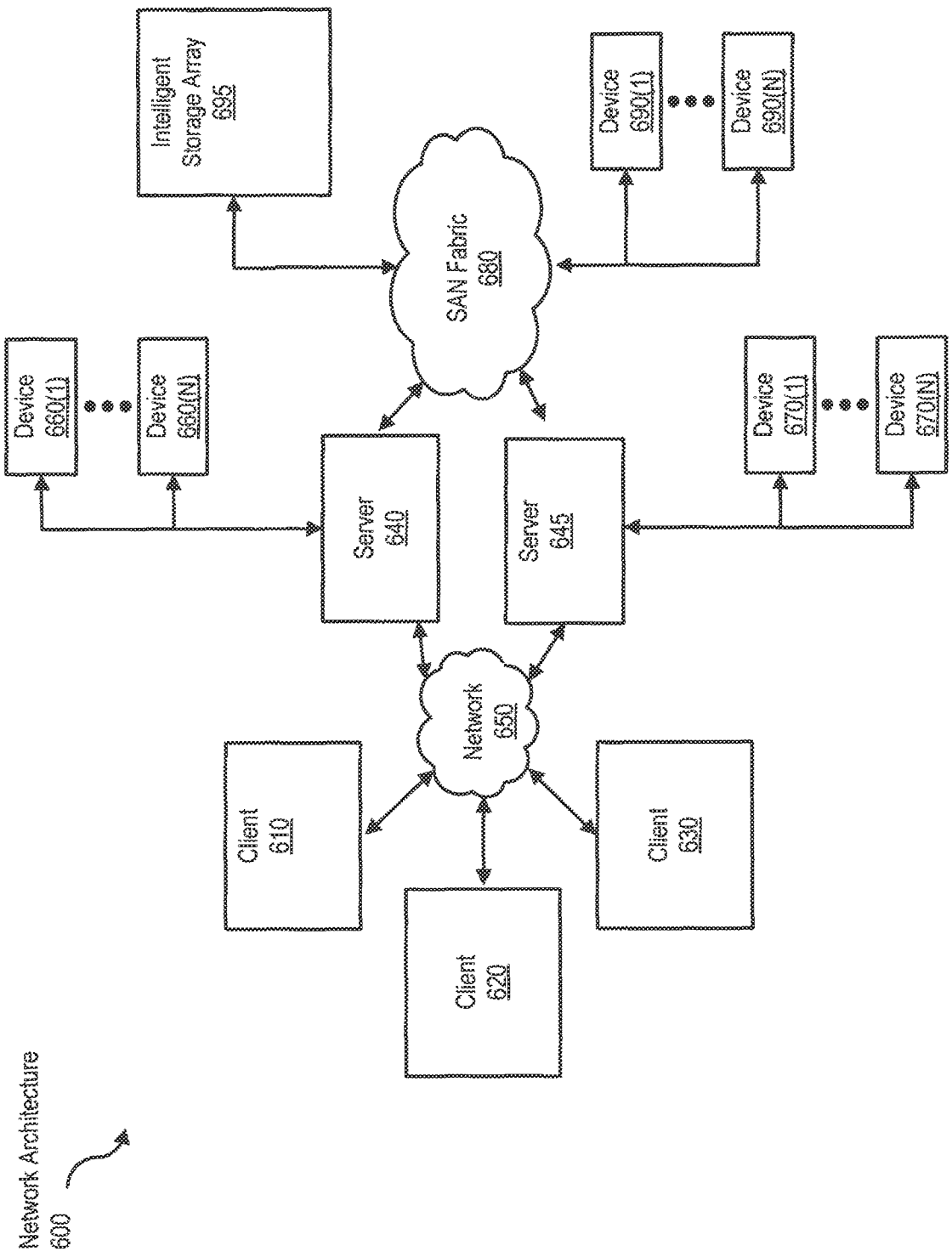

FRAMEWORK TO FACILITATE TAKING SNAPSHOTS OF WEB APPLICATION ON DEMAND

BACKGROUND OF THE DISCLOSURE

Field of Endeavor

Computer technology, and more particularly, backing up data and state information that are being used by web applications.

State of the Technology

In our modern world, many people use computer applications with various graphical user interfaces. This is especially true in the case of web applications or other software applications, such as desktop applications. These applications often have multiple sections within the application, and can provide very rich functionalities. However, these same benefits can also lead to various problems which have not yet been addressed.

As one example, a user can often accidentally close an application while he or she is in a middle of using that application, or the application (or entire computer system) may likewise crash. In that situation, a user may have entered data, selected various menu items, navigated through various directory trees, and so forth. Previously, all of that information and other user interface state information would have been lost. As another example, a user may be using an email application. The user may navigate to a folder, perform a search, select an item, and begin to read that item. A user may wish to record his or her current state in that application, so that the user can easily revisit that same state at a future time. Currently there is no way for user to directly go to the last state of the application or save the state and come back to that in a later stage.

SUMMARY OF THE DISCLOSURE

The disclosure generally includes methods, computer program products, computer systems, and the like, that provide for capturing and storing state information and other data from a web application. In one embodiment, a computer system captures the data and state information from a web application on demand, as requested by a user. In one embodiment, a computer system captures the data and state information from a web application on a regular basis or at prescheduled intervals. In one embodiment, a computer system captures the data and state information from a web application when a predefined event occurs, such as, for example, closing the web application. In each of these situations, the system retains and can store both the data (e.g., data entered into a web form) as well as state information (e.g., the current state of a user interface, such as, for example, a scroll location on a webpage or a location in an expanded folder directory tree). Regardless of how the information is captured and saved (e.g., on demand, on schedule, or on the occurrence of an event), a user can then selected a particular version of the data and state information to restore when he or she re-opens the application. In one embodiment, this selection can be made by accessing a list of versions of captured data and various user interface state information, such as preprocessing state information and observer object information. Upon selecting the version to restore, the system can use the stored information to re-create the previous state of the web application (such as, e.g., re-populating any previously-entered form data and/or restoring the state of the user interface to the previously-saved state).

The foregoing is a summary and thus contains, by necessity, simplifications, generalizations and omissions of detail, consequently those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

The embodiments of the present application may be better understood, and its numerous objects, features, and advantages made apparent to those skilled in the art by referencing the accompanying drawings.

FIG. 2A is a flowchart for creating a snapshot, according to one embodiment of this disclosure.

FIG. 2B is a flowchart that provides additional details for the step of capturing snapshot information, according to one embodiment of this disclosure.

FIG. 3 is a flowchart for storing a snapshot of data and state information, among other potential information, according to one embodiment of this disclosure.

FIG. 4B is a flowchart that provides additional details for the step of using snapshot information to restore the web application, according to one embodiment of this disclosure.

FIG. 6 is a block diagram of a networked system, illustrating how various computing devices can communicate via a network, according to one embodiment of the present disclosure.

Figure 1:
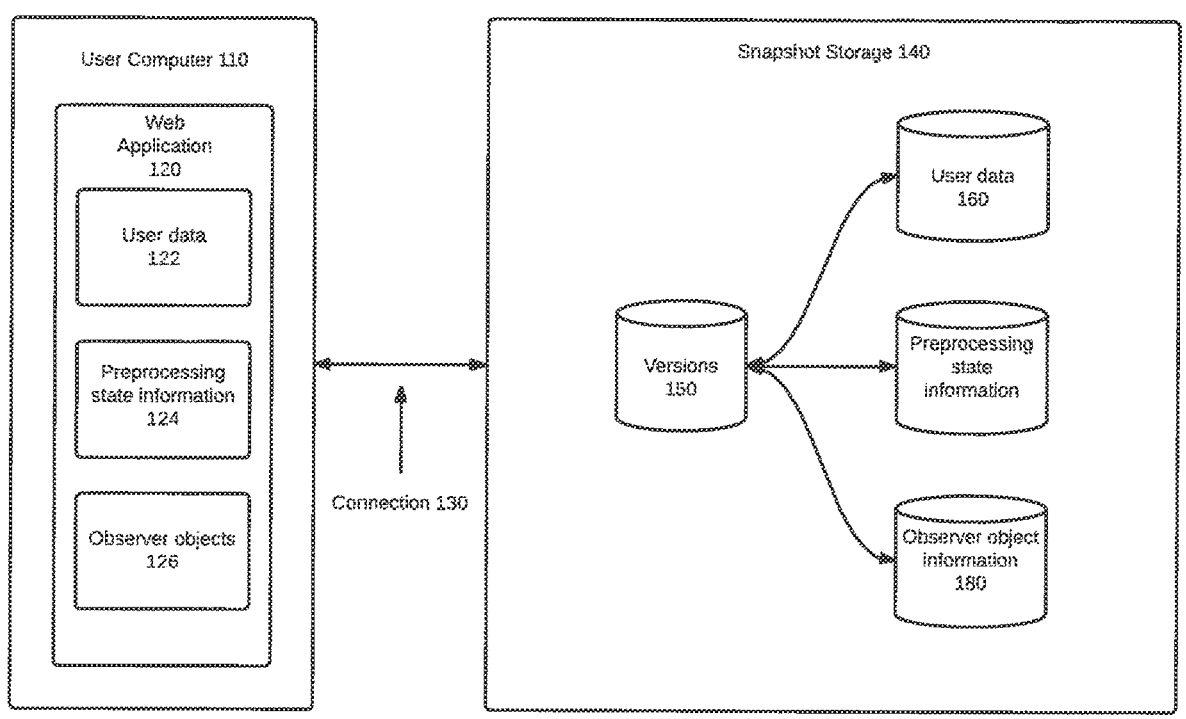
FIG. 1 is a block diagram depicting an example computing environment, according to one embodiment of this disclosure.

While the embodiments of the present disclosure are susceptible to various modifications and alternative forms, specific embodiments are provided as examples in the drawings and detailed description. It should be understood that the drawings and detailed description are not intended to limit the embodiments to the particular form disclosed. Instead, the disclosure is intended to cover all modifications, equivalents and alternatives falling within the spirit and scope of the disclosure as defined by the appended claims.

DETAILED DESCRIPTION

The present disclosure describes methods, computer program products, computer systems, and the like that provide for capturing and storing state information and other data from a web application. More specifically, the present disclosure provides for capturing and storing snapshots of a web application's data and state information when various actions and events occur, such as those described in more detail below. Upon capturing such snapshots, the present disclosure also provides for storing such information in one or more versions, which can later be used to restore a web application to a prior state in the event of a crash, accidental closure, or similar activity taking place. The present disclosure also provides for using the stored snapshots to actually restore the web application when a crash, accidental closure, or similar activity takes place, an activity which can be done either automatically and/or in conjunction with input received from a user. The foregoing functionality will be described in more detail below, along with other aspects and uses of this disclosure.

FIG. 1 shows a computer system 100 that includes a user computer 110 (such as, e.g., a client computer). The user computer can be any computer capable of running a web application, or other software application, such as web application 120, in which it is advantageous for saving and restoring information (e.g., user data, preprocessing state information, and observer object information) external to the web application. Although referred to as a "web" application herein, web application 120 can be any computer application that is configured (or capable of being configured) to perform one or more of the steps disclosed herein, without necessarily being a webpage or connected to the Internet. As shown in FIG. 1, web application 120 comprises user data 122, preprocessing state information 124, and observer objects 126.

When a web application first loads, the user data 122 can be blank. That is, the web application can include user data fields into which a user can input data, but which fields are currently blank as of when the page loads. In other embodiments, certain user data fields may be pre-populated and/or other user data can be dynamically included in the web application's source code, such as, e.g., a dynamically-generated web page code in HTML, XML, JAVASCRIPT, COLDFUSION, ASP, or some other programming language suitable for producing web pages. Moreover, although not expressly depicted in FIG. 1, the captured (or snapshotted) user data can be stored in a snapshot data structure. Because the specific data that will be captured varies from application to application, the snapshot data structure used to store the data can also vary from application to application. In one embodiment, the snapshot data structure used to store the data can be included in the application's source code. In another embodiment, the snapshot data structure used to store the data can be customized and/or configured by an administrator, or other user. In one embodiment, the snapshot data structure used to store the data can be configured in another manner. In one embodiment, a combination of the foregoing methods can be used.

Although not expressly depicted as such in FIG. 1, the preprocessing state information 124 and observer objects 126 can collectively be referred to as the user interface (UI) state information. A web application can have multiple UI components that are used to control the display and functionality of the webpage, each of which can have preprocessing state information 124 and one or more observer objects 126. In various embodiments, such control components can include one or more of a navigation component, a search component, a results component, a preview component, and various other UI controls. Each of these control components, whether taken individually or collectively, can exist in various states and can change as a result of user interaction. For instance, a user may scroll on the page, or enter text in an input box. As other examples, a user may select an item from a first menu (e.g., selecting the state of "Texas" from a list of states), which causes the UI to populate a second menu (e.g., a list of counties or cities in the state of Texas) from which a user may then select. In other situations, a user may simple select or highlight some text that the user wants to copy or revisit later, or perhaps navigate between pages on a form without necessarily submitting the information to a server between pages (such as might occur when using an embedded object, such as a JAVA APPLET). In another instance, a user of a mail application may have navigated to a specific folder or document prior to the web application being closed, and may wish to return to that location when the web application is reloaded, reopened, etc. These are only a few examples among many such situations which can occur during the use of a web application having one or more UI control components.

As also shown in FIG. 1, user computer 110 (and by extension, web application 120 and the components thereof) are connected via connection 130 to snapshot storage 140. In one embodiment, connection 130 can be the Internet, or some other network connection such as a WAN, LAN, wireless connection, BLUETOOTH connection, and so forth. In another embodiment, such as where the snapshot storage is physically stored on user computer 110, connection 130 may be a series of internet connections, such as circuits, bridges, and so forth.

Snapshot storage 140 can be any computer (or portion of a computer) capable of storing information and performing the methods disclosed here. In one embodiment, snapshot storage 140 is a server running on a distinct physical machine from user computer 110. In another embodiment, snapshot storage 140 can include one or more components that are being executed on user computer 110. In other embodiments, other scenarios and configurations are possible.

As shown in FIG. 1, snapshot storage 140 is a standalone server configured to store one or more snapshot versions 150, which will be discussed in more detail below. At a high level, however, a snapshot version can include some sort of identifying information, particularly in environments configured to maintain more than one snapshot at a time. Such identifying information may include, e.g., a user name and a timestamp indicating the date and/or time at which the snapshot was captured. In other embodiments, a snapshot version may also include a graphical representation of the information captured by the corresponding snapshot, such as a screenshot of the user's screen (or a portion of the user's screen) at the moment the snapshot was captured. In other embodiments, other identifying information can be included in the snapshot version.

As also shown in FIG. 1, each snapshot version can be associated with various forms of information, such as, e.g., data, preprocessing state information, and observer object information. The various forms of snapshot information are stored in one or more snapshot storage data stores, such as, e.g., user data 160, preprocessing state information 170, and observer object information 180. In FIG. 1, these data stores are shown as being distinct from each other. For instance, FIG. 1 depicts separate data stores for user data, preprocessing state information, and observer object information. In other embodiments, one or more of these data stores can be combined into a single data store. Regardless of how this information is stored, certain embodiments key each set of information for (or in some other way associate this information with) the snapshot version to which that information corresponds.

FIG. 2A is a flowchart of a method 200 illustrating various actions performed in connection with one embodiment of the systems and techniques disclosed herein. As will also be appreciated in light of the present disclosure, this method may be modified in order to derive alternative embodiments.

Moreover, although the steps in this embodiment are shown in a sequential order, certain steps may occur in a different order than shown, certain steps may be performed concurrently, certain steps may be combined with other steps, and certain steps may be omitted in another embodiment. Method 200 is described with reference to elements such as those described in connection with FIG. 1.

Method 200 begins at 210, where the system determines a user's configuration preferences. In one embodiment, these configuration preferences can be pre-set by an administrator, or similar user account. In one embodiment, these configuration preferences can be preprogrammed into the code for a specific web application. Particularly in the case where these configuration preferences are either pre-set by an administrator (or other user) and/or preprogrammed into the source code, these configuration preferences can be thought of as the "default" configuration preferences. In one embodiment, these configuration preferences can be completely set by a user. In one embodiment, a user can customize a set of default configuration preferences, thereby keeping some of the default configuration preferences but changing others. In one embodiment, these configuration preferences can be set in a different manner. In other embodiments, these configuration preferences can be set via a combination of two or more of the foregoing options.

The configuration preferences themselves can include various default and/or customizable attributes. As one non-limiting example, these configuration preferences can include an attribute that is representative of the time intervals at which snapshots should automatically be taken. For instance, the time interval attribute may be assigned a value of 30 seconds, 60 seconds (or one minute), five minutes, ten minutes, and so forth. In another embodiment, the option to automatically take time-based snapshots can be turned off completely. As another non-limiting example, these configuration preferences can include the ability to select and/or customize various "events" that should automatically cause snapshots to be taken. For instance, a system can be configured to automatically take a snapshot every time a user types a certain number of characters, in which case the number of characters can also be specified and/or changed; or every time a user performs a certain action, such as "tabbing" to a different field of a web application, manually selecting a different field of a web application, or navigating through a drop-down menu or similar component of a web application, in which case the various events that will trigger an automatic snapshot can be specified and/or changed. In another embodiment, a system can be configured to automatically make a snapshot prior to closing the web application, particularly where the web application is closed as the result of a user action. In another embodiment, the option to automatically take event-driven snapshots can be turned off completely. In one embodiment, all such configuration preferences can be "turned off" or unselected, in which case snapshots would only be taken when a user manually initiates the snapshot (such as, e.g., by activating a button in a visual menu, selecting an option in a dropdown menu, or using a keyboard shortcut keyed to the initiation of a snapshot). The foregoing are only intended to be example configuration preferences to facilitate the discussion in this disclosure, and therefore are not meant to be limiting in any way whatsoever. Many other configuration preferences and values are possible, as are combinations of the foregoing (and other) example approaches.

In step 220, the web application (or a component thereof) can register the preprocessing methods and the object properties that are to be observed. In one embodiment, these methods and objects are registered with a snapshot server. As one example, when the web application loads a page from a server, the web application can raise a "store data" event and register that event with the snapshot server or with the client computer upon which the web application is being executed. The snapshot server or local computer can "listen" for this event. Similarly, the web application's UI can have one or more controls, such as, e.g., a navigation UI control, search UI control, results UI control, preview UI control, among other potential UI controls. Every UI control has one or more properties associated with it. Each of these UI controls will register an event with the snapshot provider. Observer objects will then "listen" for changes to any property of a particular item, and will update the UI state for that particular control.

Observer objects can continuously listen to the various control components of the UI to determine when changes occur to the various properties of those control components. For instance, a user may scroll in a list. The system can register the "scroll" property (or "scroll location" property) of the UI with an observer object. Thereafter, when a user performs a scroll, the associated observer object will "listen" to or monitor the changes that happen to that property, and the observer object will continuously (or regularly) update itself to reflect the current state (or "value") of the property being observed. Moreover, a user interface may have multiple control components, such as, e.g., a navigation component, a search component, a results component, a preview component, and various other UI components. In such a case, each control component can separately register its own preprocessing methods and observer objects with the snapshot server.

In step 230, method 200 can track changes to the data and state information of a web application as that information is being entered or as that information is otherwise being changed. In one embodiment, these changes can be tracked by a daemon. The daemon can monitor and track data as it is being entered, and can also track observer object properties as they are being changed. In one embodiment, the daemon tracks the information when one of the events (that had been registered with the snapshot server, or otherwise) are triggered. Tracking such information creates a temporary local copy of the information, which can be used in the event of a system crash, web application crash, error, accidental closure of the web application, and in similar situations. Such information can be stored in either a non-persistent memory (e.g., RAM) or can be stored as a temporary file in a persistent memory (e.g., a hard disk drive or a flash drive). However, tracking such information does not necessarily create a permanent copy of the information. Rather, this information can be used to create a snapshot if the application is suddenly closed for some reason, such as for the reasons given above. For instance, if a system is configured to create a full snapshot every 5 minutes, then there could be up to 4 minutes and 59 seconds worth of activity that has occurred since the last backup. The information entered since the last snapshot was made would otherwise be lost if the application were suddenly closed prior to the next snapshot being made. Thus, the functionality of step 230 allows for a system to temporarily capture this data in case that data is needed later, but to do so in a manner that does not require the processing overhead that would be needed to actually write a snapshot every time information is entered or changed. In one embodiment, this temporary information can be stored in a "log" file that records each keystroke, such as plain text file formatted to store such information. In other embodiments, this information can be stored in a different manner or format.

Moreover, while any step of method 200 can be omitted in a given embodiment, step 230 is optional. In a sense, this step is an "extra" step that can be used to increase the accuracy of method 200, but which does so at the tradeoffs of potentially slowing down the operating system and creating the ability for a system to track more data than some users may be comfortable with. For instance, a user may determine in step 210 that he or she does not want his activity constantly being tracked, and therefore can turn off (or "disable") this functionality. The user may also disable this functionality for various other reasons, such as, e.g., wanting to avoid any potential "lag time" that may be caused by this functionality in the normal course of input-output operations. Therefore, the user and the administrator may be especially likely to disable this feature for various reasons, such as (but not limited to) the reasons given above. Turning off this functionality will, of course, increase the likelihood that the user will lose data that has not yet been captured in a snapshot, such as would be the case in the event of a system crash, application crash, accidental closure of the application, power loss, and so forth, although this flexibility may nevertheless be both important and desirable to many users.

In step 235, method 200 monitors for a request to take a snapshot. This request can take the form of an affirmative user-generated request (e.g., such as clicking a button, selecting a menu item, or entering a keyboard shortcut). This request can also take the form of a time-based "request" that is automatically generated at regular intervals (e.g., every 5 minutes). This request can also take the form of an event-driven "request" that occurs every time a certain action or actions are performed (e.g., "tabbing" to a different field of a web application, manually selecting a different field of a web application, or navigating through a drop-down menu or similar component of a web application), and/or detecting of a change in the information entered into, making up, or otherwise affecting the given web application. In one embodiment, this "request" can happen automatically, such as when a user closes a web application or when a web application crashes or otherwise shuts down. In other embodiments, a request to take a snapshot can be generated in other manners.

Regardless of how the request is generated, if a request to create a snapshot is received in step 235, then method 200 proceeds to step 240. If a request to create a snapshot is not received in step 235, then method 200 will continue monitoring for such a request. In one embodiment, this will require the method looping back to an earlier portion of the method. As shown in FIG. 2A, the method loops back and re-performs step 235. In other embodiments, particularly if step 230 is optionally not being used, then step 235 can simply loop back unto itself and continuing awaiting a request to take a snapshot. In one embodiment, step 235 can perform its monitoring activity in a thread that is separate from one or more threads used to perform various other steps of this method. In other embodiments, other specific scenarios and implementations of step 235 (and method 200, as a whole) are possible. The particular monitoring and looping structure shown in FIG. 2A is for ease of discussion, but is not intended to be limiting in any way except as may be expressly stated in this disclosure.

In step 240, method 200 captures the information needed to make the snapshot. In one embodiment, the snapshot can be a copy-on-write snapshot. In one embodiment, the snapshot can be a redirect-on-write snapshot. In other embodiments, other snapshot implementation strategies can be used. In one embodiment, a daemon determines what information should be included in the snapshot. In various other embodiments, the information to be included in the snapshot can be determined in other manner. In one embodiment, the captured information includes at least user data and user interface state information, the latter of which can include both preprocessing information and observer object information. Additional details regarding step 240 are provided in FIG. 2B, and will be discussed herein at this time before returning to the final steps of FIG. 2A. As can be seen from steps 242, 244, and 246 of FIG. 2B, the single step of capturing the snapshot information can actually include one or more distinct steps. For example, as shown in FIG. 2B, step 240 can include one step to capture user data, one step to capture preprocessing information, and one step to capture observer object information. In other embodiments, one or more of these steps can be combined into a single step, or one or more of these steps can subdivided further or performed in a slightly different manner or with respect to different data types or data structures. In any event, each of the types of information enumerated in FIG. 2B is discussed in more detail below.

User data can be any data or other information entered by a user while s/he is using the web application. For instance, user data can often take the form of alphanumeric characters or other input entered in a text box, email body, or other portion of the web application, such as URL or address field, although user data need not be limited to these examples. In other embodiments, user data can take the form of various file types that may be uploaded or attached to a webpage, or even created in or through the webpage, such as PDF files; text documents (e.g., .doc or .txt files); spreadsheet pages, workbooks, or files; or even image files, sound files, and/or movie files, among may other examples.

The preprocessing state information includes information about preprocessing methods. Preprocessing methods are the methods that are required to be executed before a web application can actually initialize a UI state of a control. For instance, a user may want to open a context menu. Opening a context menu may require some pre-processing to be done, such as creating an instance of a context menu and populating the options in that context menu. Preprocessing state information must be recorded regarding these methods, because these methods are required to restore the UI state of an object (such as, e.g., a context menu).

The observer object information can include information related to the changed state of an object within the web application, and/or within a control component of the web application, such as the examples listed above. Observer object information can include information that would not typically be described as data entered by a user, but which reflects or captures other actions taken by a user, and especially changes to the property of an observable object. For instance, observer object information can include the current scroll location on a webpage; the current cursor position in a form, document, email, and such; or the current folder selection in a mail application. As another example, observer object information can include the current selection within a menu or series of menus, such as the aforementioned example of a user who first select a state, which causes the population of a different field in the application (e.g., a field or menu containing a list of counties or cities within that state), where the second list is populated based on the selection made in the first list. Here again, of course, many other examples are also possible.

In step 250, the information that was captured in step 240 (and/or steps 242, 244, and/or 246) is transmitted to a system that is configured to store the snapshot ("snapshot storage"). In one embodiment, each type of information captured in step 240 (and/or steps 242, 244, and/or 246) can be transmitted individually, as it is captured; or can be bound together and transmitted as a single data structure or in a single series of transmissions. In practice, the precise method in which this data is transmitted is not important, as long as all of the data is transmitted to the appropriate snapshot storage. In one embodiment, the snapshot storage can be a server ("snapshot server") that is distinct from the computer on which the web application is running. In one embodiment, the snapshot storage can be a collection of computing devices, such as "a cloud" or a storage area network. In one embodiment, the snapshot storage can be an area of persistent, non-transient memory on the same physical machine on which the web application is running. In any of these situations, the transmission can occur via any acceptable and appropriate transmission mechanism, such as via an external network connection and/or via components that are internal to a computer system. Finally, in step 260, the transmitted snapshot will be stored in the designated snapshot storage location. Step 260 is discussed in more detail in conjunction with FIG. 3, and method 300, below.

FIG. 3 is a flowchart of a method 300 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Method 300 is described with reference to elements such as those described in connection with FIG. 1.

Method 300 begins at 310, where the user data portion of a snapshot (such as, e.g., the snapshot that was captured in 240 and transmitted in 250) is received. In step 320, the preprocessing state information of a snapshot is received, and in 330, the observer object information is received. While steps 310, 320, and 330 are shown as discrete steps in FIG. 3 for ease of discussion, in practice one or more of these steps can be combined into a single step. Moreover, these steps can be performed in any order, and/or simultaneously or substantially simultaneously to each other.

When the various forms of snapshot information have been received, method 300 creates a snapshot version in step 340. As is discussed in more detail elsewhere herein, in one embodiment, a distinct snapshot version can be created (e.g. in the snapshot storage) for every snapshot that is captured from a client machine. Such functionality allows a user to recreate the state of the web application from any point in time at which a snapshot was captured. In some embodiments, a system can be configured to retain only a certain number of snapshots (e.g., the five most recent snapshots), to retain snapshots only for a certain period of time (e.g., all snapshots created during the last 24 hours), or perhaps even to retain only the most recent snapshot. Such configurations may occur for various reasons, such as, e.g., due to memory constraints.

In one embodiment, a snapshot version includes some sort of identifying information, particularly in environments configured to maintain more than one snapshot at a time. Such identifying information may include, e.g., a user name and a timestamp indicating the date and/or time at which the snapshot was captured. In other embodiments, a snapshot version may also include a graphical representation of the information captured by the corresponding snapshot, such as a screenshot of the user's screen (or a portion of the user's screen) at the moment the snapshot was captured. In other embodiments, other identifying information can be included in the snapshot version.

In steps 350, 360, and 370, the various forms of snapshot information are stored in one or more snapshot storage data stores. For instance, the user data snapshot can be stored in a first data store, the preprocessing state information can be stored in a second data store, and the observer object information snapshot can be stored in a third data store. Regardless of how this information is stored, each set of information must be keyed for (or in some other way associated with) the snapshot version to which that information corresponds. In one embodiment, each type of information received in steps 310, 320, and 330 can be stored in a single data store, in which case logical steps 350, 360, and 370 can practically be combined into a single step, although doing so is not required even if all three types of information are stored in the same single data store. In other embodiments, each type of information received in steps 310, 320, and 330 are stored in two or more distinct data stores, in which case logical steps 350, 360, and 370 would generally be performed as two or more distinct steps in practice. In other embodiments, steps 350, 360, and 370 can be performed in any order, and/or simultaneously or substantially simultaneously to each other.

Figure 4A:
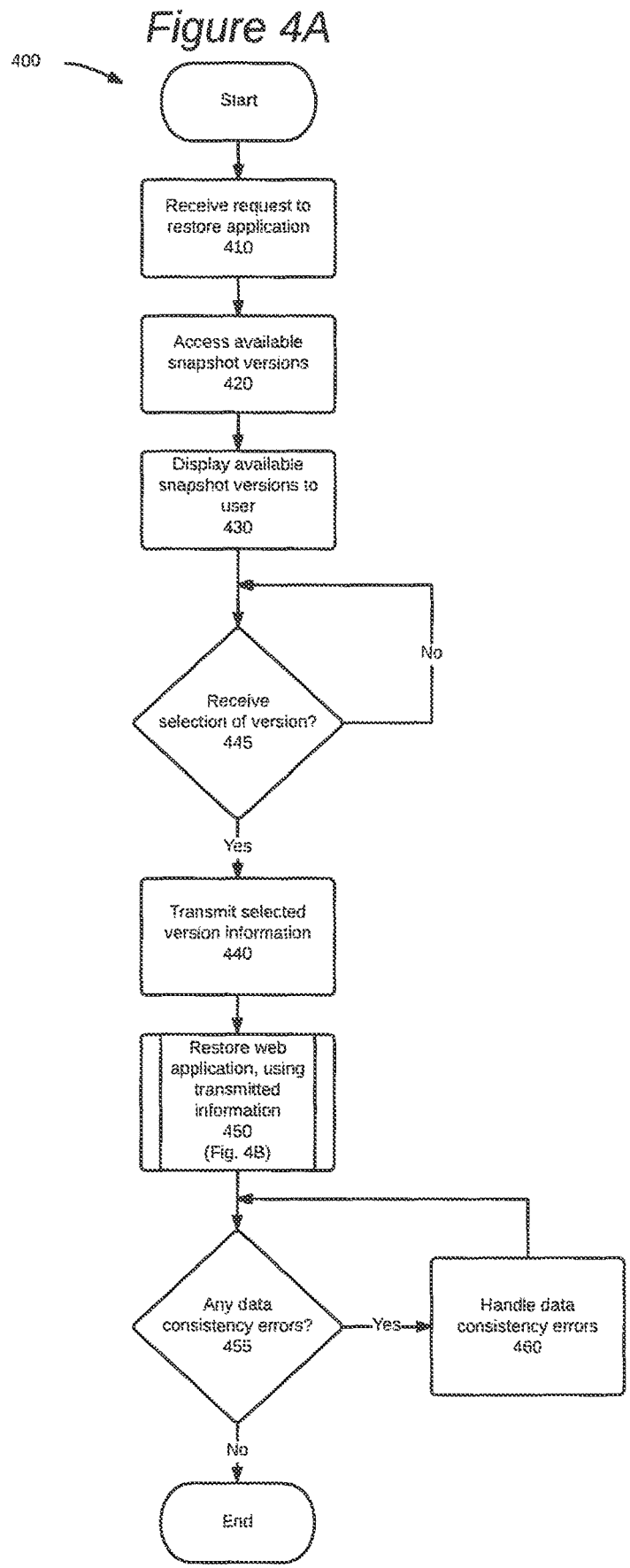
FIG. 4A is a flowchart for using a snapshot of data and state information to restore the state of a web application, such as may be necessary following a crash or accidental closure of the web application, among other potential information, according to one embodiment of this disclosure.

FIG. 4A is a flowchart of a method 400 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Method 400 is described with reference to elements such as those described in connection with FIG. 1.

Method 400 begins at 410, where method 400 receives a request to restore a web application. This request can be manually generated by a user, such as when a user desires to "roll back" the web application to a previous state; or automatically generated by an event, such as an inadvertent closure by a user or an unexpected closure by the system (e.g., a "crash") of the web application. In other embodiments, this request can be generated in other manners. Regardless of how the request is generated, the request must be transmitted to the thread or other computing component that performs method 400, and that request is received by method 400 in step 410. In various embodiments, prior to being received in step 410, this request can be transmitted via any acceptable and appropriate transmission mechanism, such as via an external network connection and/or via components that are internal to a computer system.

After receiving the request to restore in step 410, step 420 accesses a data store containing information identifying the snapshot version(s) that are available for a given user and/or application. As indicated above, such identifying information may include, e.g., a user name and a timestamp indicating the date and/or time at which the snapshot was captured. In other embodiments, a snapshot version may also include a graphical representation of the information captured by the corresponding snapshot, such as a screenshot of the user's screen (or a portion of the user's screen)

at the moment the snapshot was captured. In other embodiments, other identifying information can be included in the snapshot version.

In step 430, method 400 can display information identifying the available snapshot version(s) to an end user. In one embodiment, step 430 can display this information as a listing of available snapshot versions, where each snapshot is identified by textual information, such as the date and time at which the snapshot was created. In one embodiment, 430 can display this information as a series of visual representations of each available snapshot version, in which case each visual representation may include a screenshot (or portion or representation of a screenshot) reflecting the state of the web application at the time the associated snapshot version was created. In other embodiments, this information can be displayed in other manners. Regardless of the specific manner in which this information is displayed, however, the information should be presented in a manner that enables a user to select a specific snapshot version to restore. Accordingly, and in various embodiments, this information can be presented in a manner that allows a user to use a mouse or a touch screen gesture to choose a selected snapshot version, and/or to allow the user to enter a keyboard command (or series of keystrokes) to choose a selected snapshot version.

In various other embodiments, step 430 may be skipped or modified. For instance, step 430 may not be necessary if the system is configured to only store one snapshot at a time, or if the system is configured to automatically restore the web application in a given situation without requiring the user to first select a specific snapshot version for use in the restoration process. In another embodiment, the version can be automatically selected by the system, at which point the user can receive a simple "yes/no" (or "OK/Cancel") type of message asking for his or her permission to proceed with using the most recent (or only) snapshot version to restore the web application.

In step 445, method 400 monitors for the receipt of a selection of the snapshot version that is to be used to restore the web application. As noted above, the version information should have been presented (such as, e.g., in step 430) in a manner that enables a user to select a specific snapshot version to restore. Accordingly, and in various embodiments, this information should have been presented in a manner that allows a user to use a mouse or a touch screen gesture to choose a selected snapshot version, and/or to allow the user to enter a keyboard command (or series of keystrokes) to choose a selected snapshot version. In another embodiment, the version can be automatically selected by the system. In one embodiment, if the version is automatically selected by the system, the user can receive a simple "yes/no" (or "OK/Cancel") type of message asking for his or her permission to proceed with using the most recent (or only) snapshot version to restore the web application.

Regardless of whether the version is selected automatically or by a user (such as in one of the manners described above, in addition to other such possibilities), if a version selection is received in step 445, then method 400 proceeds to step 450. If a request to create a snapshot is not received in step 445, then method 400 will continue monitoring for such a request. In one embodiment, this will require the method looping back to an earlier portion of the method. As shown in FIG. 4A, the method loops back and re-performs step 445. In one embodiment, step 445 can perform its monitoring activity in a thread that is separate from one or more threads used to perform various other steps of this method. In other embodiments, other specific scenarios and implementations of step 555 (and method 500, as a whole) are possible. The particular monitoring and looping structure shown in FIG. 5A is for ease of discussion, but is not intended to be limiting in any way except as may be expressly stated in this disclosure.

In step 440, method 400 transmits the information associated with the selected version. In one embodiment, the transmitted information includes the user data, preprocessing state information, and the observer object information that were previously stored, such as, e.g., in steps 350, 360, and 370. In one embodiment, this information is transmitted to the system on which the web application is being executed.

In step 450, method 400 uses the information transmitted in step 440 to restore the web application to the previous state associated with the selected version. In one embodiment, the transmitted information includes at least user data, preprocessing state information, and observer object information. Additional details regarding step 450 are provided in FIG. 4B, and will be discussed herein at this time. As can be seen from steps 452, 454, and 456 of FIG. 4B, the single step of using the snapshot information to restore the web application can actually include one or more distinct steps. For example, as shown in FIG. 4B, step 450 can include one step to first restore user data, one step to next restore the preprocessing state information, and one step to finally restore observer object information. In any event, each of the steps enumerated in FIG. 4B is discussed in more detail below.

In step 452, the web application first repopulates the user data. In one embodiment, this step must be done first, because step 454 is dependent upon the value of this data. For instance, user data may include the selection of a state in a list of states (e.g., Texas). The value of this "state" selection may be needed in order to perform one or more of the preprocessing methods, such as displaying a list of counties or cities that are located in that state.

After the user data has been repopulated in step 452, method 400 can use the preprocessing state information in step 454 to invoke any necessary preprocessing methods. For instance, and continuing with the example above, step 454 can determine that the state of "Texas" was selected by a user in a first menu. Using that information from step 452, step 454 can then perform the preprocessing step of reading a database to populate a list of counties in the State of Texas, which could be displayed in a second menu.

After the relevant preprocessing methods have been performed in step 454, method 400 can use the observer object information to restore the property values of any observable objects. For instance, and continuing with the example above, step 454 can populate a list of the counties in the state of Texas, a list which would include approximately 254 values. At the time the associated snapshot was made, the user may have been in the process of scrolling through that list of counties, but without having yet selected a county. Therefore, the property of this object (i.e., the list of counties) may been equal to the 123 county (as one example among many) in the list. Using the observer objection information on top of the preprocessing state information and the user data information, step 456 can then select (e.g., "highlight" or put the cursor over) the specific county in the list of counties in Texas. The combination of steps 454 and 456 can collectively be said to restore the UI state, although step 452 must generally be performed first, for at least the reasons provided above.

After completing step 450 (e.g., as shown in the enhanced details of FIG. 4B), method 400 then makes the determination of step 455. In particular, method 400 confirms the data consistency by determining whether there are any data consistency errors. Data consistency errors will generally occur when the underlying structure of the web application has changed in the time since the snapshot was taken. Such errors would be especially likely if a user is attempting to restore the web application to a state that is not very recent, e.g., at state from a week or a month ago. Of course, such errors could arise even when trying to restore the web application to a state from even a few seconds or minutes ago, such as would be the case if the underlying data sources or source code happens to have been changed in that time period, however brief it may have been.

In one embodiment, such data consistency errors can be discovered upon restoring the snapshot, when the user will be presented with the data and user interface from the snapshot. In that scenario, data consistency errors may be discovered if the user tries to perform any action on the data from the snapshot in a manner that is no longer workable due to underlying changes in the data source or source code. In other embodiments, data consistency errors may prevent the web application from loading properly in the first place. In other embodiments, other situations are possible.

If step 455 determines that one or more data consistency errors are present, then method 400 proceeds to step 460. In step 460, method 400 handles any data inconsistency errors. In one embodiment, such errors may be handled by simply displaying the incorrect information (at least to the greatest extent possible), and then waiting for the user to take further action in light of the currently-restored state of the web application. In another embodiment, the user can be given an option to refresh the data in the snapshot but to maintain the user interface state (i.e., the preprocessing state information as combined with the observer object information). This options will use the latest data from the server and bind that data to the web application running on a client computer, but will try to restore the matching data and UI state of the snapshot to the greatest extent possible in light of the underlying changes. In another embodiment, if data to be displayed itself is very critical, the snapshot provider can refresh some or all of the data from the server while maintaining the UI state for the remaining data in the snapshot. In other embodiments, data inconsistency errors can be handled in other ways.

After performing any necessary steps from FIG. 4C, method 400 then loops back to step 455 to once again determine if there are any data consistency errors that are yet to have been resolved. If step 455 determines at any point (e.g., either on the first pass through method 400, or after performing step 460 one or more times) that there are not any data consistency errors that have to be dealt with, method 400 then ends.

Figure 5:
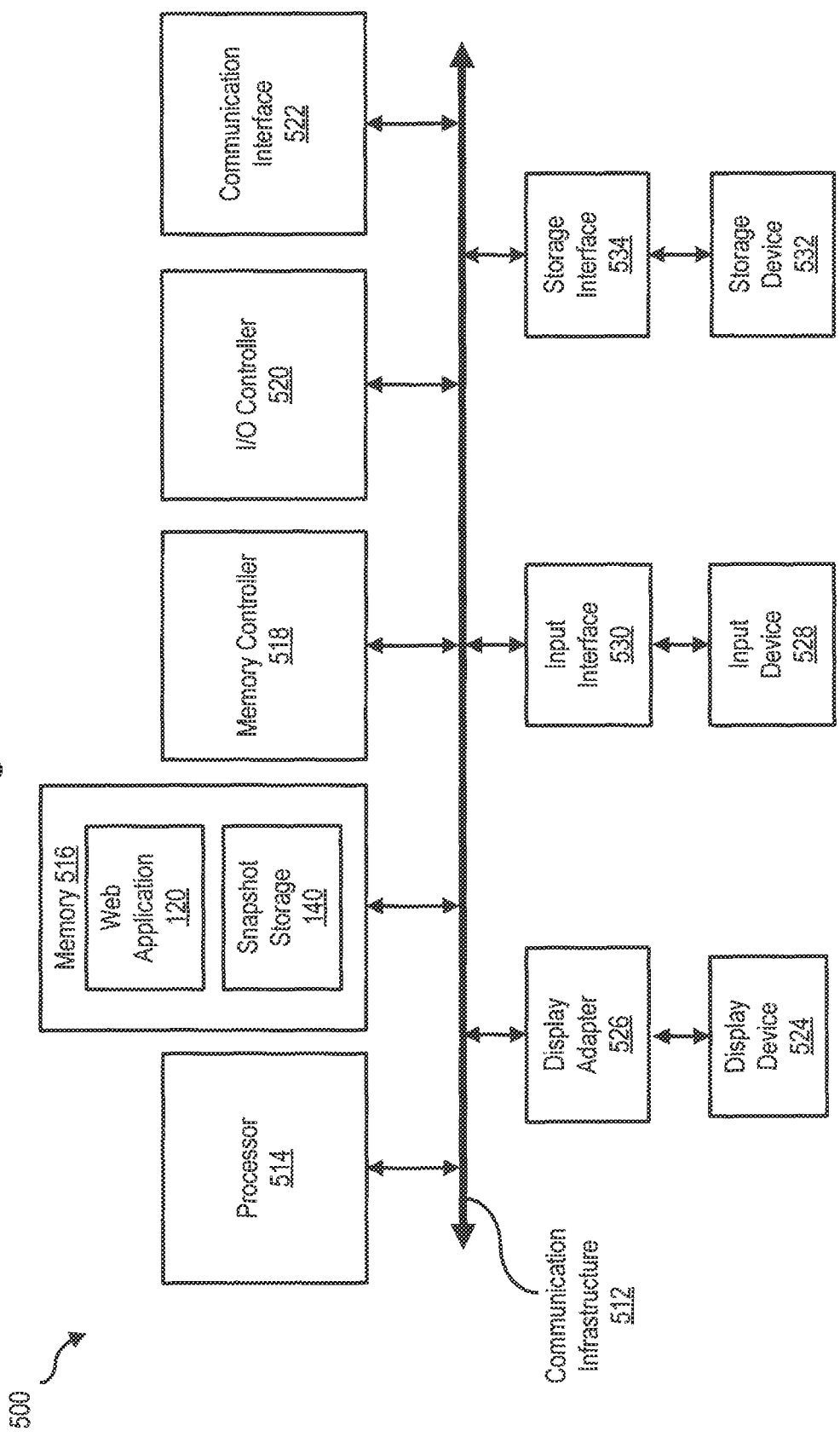
FIG. 5 is a block diagram of a computing device, illustrating how certain features of the instant disclosure can be implemented, according to one embodiment of the present disclosure.

FIG. 5 is a block diagram of a computing system 500 capable of performing one or more of the operations described above. Computing system 500 broadly represents any single or multi-processor computing device or system capable of executing computer-readable instructions. Examples of computing system 500 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 500 may include at least one processor 514 and a memory 516. By executing software that invokes web application 120 and/or snapshot storage 140, or any modifications thereof consistent with this disclosure, computing system 500 becomes a special purpose computing device that is configured to perform operations in the manner described above.

Processor 514 generally represents any type or form of processing unit capable of processing data or interpreting and executing instructions. In certain embodiments, processor 514 may receive instructions from a software application or module. These instructions may cause processor 514 to perform the functions of one or more of the embodiments described and/or illustrated herein. For example, processor 514 may perform and/or be a means for performing the operations described herein. Processor 514 may also perform and/or be a means for performing any other operations, methods, or processes described and/or illustrated herein.

Memory 516 generally represents any type or form of volatile or non-volatile storage devices or mediums capable of storing data and/or other computer-readable instructions. Examples include, without limitation, random access memory (RAM), read only memory (ROM), flash memory, a hard disk drive, or any other suitable memory device. Although not required, in certain embodiments computing system 500 may include both a volatile memory unit and a non-volatile storage device. In one example, program instructions implementing on or more operations described herein may be loaded into memory 510.

In certain embodiments, computing system 500 may also include one or more components or elements in addition to processor 514 and memory 516. For example, as illustrated in FIG. 5, computing system 500 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI express (PCIe), or similar bus) and a network.

Memory controller 518 generally represents any type or form of device capable of handling memory or data or controlling communication between one or more components of computing system 500. For example, in certain embodiments memory controller 518 may control communication between processor 514, memory 516, and I/O controller 520 via communication infrastructure 512. In certain embodiments, memory controller 518 may perform and/or be a means for performing, either alone or in combination with other elements, one or more of the operations or features described and/or illustrated herein.

I/O controller 520 generally represents any type or form of module capable of coordinating and/or controlling the input and output functions of a computing device. For example, in certain embodiments I/O controller 520 may control or facilitate transfer of data between one or more elements of computing system 500, such as processor 514, memory 516, communication interface 522, display adapter 526, input interface 530, and storage interface 534.

Communication interface 522 broadly represents any type or form of communication device or adapter capable of facilitating communication between computing system 500 and one or more additional devices. For example, in certain embodiments communication interface 522 may facilitate communication between computing system 500 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 500 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1894 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 522 may also allow computing system 500 to engage in distributed or remote computing. For example, communication interface 522 may receive instructions from a remote device or send instructions to a remote device for execution.

As illustrated in FIG. 5, computing system 500 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer) for display on display device 524.

As illustrated in FIG. 5, computing system 500 may also include at least one input device 528 coupled to communication infrastructure 512 via an input interface 530. Input device 528 generally represents any type or form of input device capable of providing input, either computer or human generated, to computing system 500. Examples of input device 528 include, without limitation, a keyboard, a pointing device, a speech recognition device, or any other input device.

As illustrated in FIG. 5, computing system 500 may also include a storage device 532 coupled to communication infrastructure 512 via a storage interface 534. Storage device 532 generally represents any type or form of storage device or medium capable of storing data and/or other computer-readable instructions. For example, storage device 532 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage device 532 and other components of computing system 500. A storage device like storage device 532 can store information such as the data structures described herein, as well as one or more computer-readable programming instructions that are capable of causing a computer system to execute one or more of the operations described herein.

In certain embodiments, storage device 532 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage device 532 may also include other similar structures or devices for allowing computer software, data, or other computer-readable instructions to be loaded into computing system 500. For example, storage device 532 may be configured to read and write software, data, or other computer-readable information. Storage devices 532 may also be a part of computing system 900 or may be a separate device accessed through other interface systems.

Many other devices or subsystems may be connected to computing system 500. Conversely, all of the components and devices illustrated in FIG. 5 need not be present to practice the embodiments described and/or illustrated herein. The devices and subsystems referenced above may also be interconnected in different ways from that shown in FIG. 5.

Computing system 500 may also employ any number of software, firmware, and/or hardware configurations. For example, one or more of the embodiments disclosed herein may be encoded as a computer program (also referred to as computer software, software applications, computer-readable instructions, or computer control logic) on a non-transient computer-readable storage medium. Examples of non-transient computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 500 for storage in memory via a network such as the Internet or upon a carrier medium.

The non-transient computer-readable storage medium containing the computer programming instructions may be loaded into computing system 500. All or a portion of the computer programming instructions stored on the non-transient computer-readable storage medium may then be stored in memory 516 and/or various portions of storage device 532. When executed by processor 514, a computer program loaded into computing system 500 may cause processor 514 to perform and/or be a means for performing the functions of one or more of the embodiments described and/or illustrated herein. Additionally or alternatively, one or more of the embodiments described and/or illustrated herein may be implemented in firmware and/or hardware. For example, computing system 500 may be configured as an application specific integrated circuit (ASIC) adapted to implement one or more of the embodiments disclosed herein.

FIG. 6 is a block diagram of a network architecture 600 in which client systems 610, 620, and 630, and servers 640 and 645 may be coupled to a network 650. Client systems 610, 620, and 630 generally represent any type or form of computing device or system, such as computing system 500 in FIG. 5.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, one or more of client systems 610, 620, and/or 630 may include software configured to execute web application 120, snapshot storage 140, and/or one or more components of web application 120 and/or snapshot storage 140, as shown in FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as Network File System (NFS), Server Message Block (SMB), or Common Internet File System (CIFS). Such storage devices can store backup information and storage configuration information, as described above.

Servers 640 and 645 may also be connected to a storage area network (SAN) fabric 680. SAN fabric 680 generally represents any type or form of computer network or architecture capable of facilitating communication between multiple storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to computing system 500 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 640, server 645, storage devices 640(1)-(N), storage devices 670(1)-(N), storage devices 690(1)-(N), intelligent storage array 695, or any combination thereof. All or a portion of one or more of the embodiments disclosed herein may also be encoded as a computer program, stored in server 640, run by server 645, and distributed to client systems 610, 620, and 630 over network 650.

In some examples, all or a portion of one of the systems in FIGS. 1, 5, and 6 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, one or more of the operations described herein may transform the behavior of a computer system such that the various operations described herein can be performed.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method, comprising:
   capturing user data and corresponding user interface state information from a current page of a web application after the current page was loaded on a client computer, wherein
   the capturing is performed by a process executing on the client computer, wherein
      the capturing is performed by the process in response to detecting either a change being made to the user data or in response to detecting a change with respect to a state of the user interface,
      the capturing is performed after the current page was loaded and prior to submitting the user data or the corresponding user interface state information to a server, and
      the capturing results in captured user data and captured corresponding user interface state information;
   storing the captured user data and the captured corresponding user interface state information in a persistent memory on the client computer;
   receiving a command to restore the web application to a previous state;
   subsequent to receiving the command to restore the web application to the previous state, displaying a list of one or more available snapshot versions;
   subsequent to displaying the list to a user, receiving a selection of a snapshot version;
   determining a selected version of captured user data and corresponding user state information to use in restoring the web application to the previous state, wherein
      the selected version of the captured user data and corresponding user state information is determined based, at least in part, on the selection of the snapshot version; and
   subsequent to determining the selected version of the captured user data and the captured corresponding user state information to use in restoring the web application to the previous state, restoring the web application to the previous state by using the selected version of the captured user data and the captured corresponding user interface state information to restore the user data and the user interface state information in the current page of the web application.

2. The method of claim 1, wherein
   the corresponding user interface state information comprises preprocessing state information and observer object information.

3. The method of claim 2, wherein
the capturing is performed in response to an occurrence of a pre-determined event.

4. The method of claim 2, wherein
prior to the storing, the captured user data, the preprocessing state information, and the observer object information are transmitted to the server as a snapshot, wherein the server is configured to store the snapshot.

5. The method of claim 2, further comprising
determining a selected version of the preprocessing state information and the observer object information to use in the restoring, wherein
the selected version of the preprocessing state information and the observer object information is determined based, at least in part, on the selection of the snapshot version.

6. The method of claim 1, further comprising:
prior to the capturing, determining one or more user preferences that govern the capturing.

7. The method of claim 2, further comprising:
prior to the capturing, registering one or more observer objects with the server.

8. The method of claim 2, wherein the restoring further comprises:
first using the captured user data to restore the user data in the web application,
next using the preprocessing state information to restore one or more preprocessing methods, and
finally using the observer object information to restore one or more observer object properties.

9. The method of claim 1, further comprising:
subsequent to the restoring, resolving one or more data consistency errors.

10. A system comprising:
a microprocessor; and
a non-transient computer-readable storage medium, comprising computer instructions executable by the microprocessor, wherein the computer instructions are configured to perform a method comprising the steps of:
capturing user data and corresponding user interface state information from a current page of a web application after the current page was loaded on a client computer, wherein
the capturing is performed by a process executing on the client computer, wherein
the capturing is performed by the process in response to detecting either a change being made to the user data or in response to detecting a change with respect to a state of the user interface,
the capturing is performed after the current page was loaded and prior to submitting the user data or the corresponding user interface state information to a server, and
the capturing results in captured user data and captured corresponding user interface state information;
storing the captured user data and the captured corresponding user interface state information in a persistent memory on the client computer;
receiving a command to restore the web application to a previous state;
subsequent to receiving the command to restore the web application to the previous state, displaying a list of one or more available snapshot versions;
subsequent to displaying the list to a user, receiving a selection of a snapshot version;
determining a selected version of captured user data and corresponding user state information to use in restoring the web application to the previous state, wherein
the selected version of the captured user data and corresponding user state information is determined based, at least in part, on the selection of the snapshot version; and
subsequent to determining the selected version of the captured user data and the captured corresponding user state information to use in restoring the web application to the previous state, restoring the web application to the previous state by using the selected version of the captured user data and the captured corresponding user interface state information to restore the user data and the user interface state information in the current page of the web application.

11. The system of claim 10, wherein
the corresponding user interface state information comprises preprocessing state information and observer object information.

12. The system of claim 11, wherein
the capturing is performed in response to an occurrence of a pre-determined event.

13. The system of claim 11, wherein the method further comprises:
determining a selected version of the preprocessing state information and the observer object information to use in the restoring, wherein
the selected version of the preprocessing state information and the observer object information is determined based, at least in part, on the selection of the snapshot version.

14. The system of claim 11, wherein the method further comprises:
prior to the capturing, registering one or more observer objects with the server.

15. The method of claim 11, wherein the restoring further comprises:
first using the captured user data to restore the user data in the web application,
next using the preprocessing state information to restore one or more preprocessing methods, and
finally using the observer object information to restore one or more observer object properties.

16. The method of claim 10, wherein the method further comprises:
subsequent to the restoring, resolving one or more data consistency errors.

17. A computer program product, comprising a plurality of instructions stored on a non-transient computer-readable storage medium, wherein the instructions are configured to execute a method comprising the steps of:
capturing user data and corresponding user interface state information from a current page of a web application after the current page was loaded on a client computer, wherein
the capturing is performed by a process executing on the client computer, wherein
the capturing is performed by the process in response to detecting either a change being made to the user data or in response to detecting a change with respect to a state of the user interface, the capturing is performed after the current page was loaded and prior to submitting the user data or the corresponding user interface state information to a server, and the capturing results in captured user data and captured corresponding user interface state information;

storing the captured user data and the captured corresponding user interface state information in a persistent memory on the client computer;

receiving a command to restore the web application to a previous state;

subsequent to receiving the command to restore the web application to the previous state, displaying a list of one or more available snapshot versions;

subsequent to displaying the list to a user, receiving a selection of a snapshot version;

determining a selected version of captured user data and corresponding user state information to use in restoring the web application to a previous state, wherein the selected version of the captured user data and corresponding user state information is determined based, at least in part, on the selection of the snapshot version; and subsequent to determining the selected version of the captured user data and the captured corresponding user state information to use in restoring the web application to a previous state, restoring the web application to the previous state by using the selected version of the captured user data and the captured corresponding user interface state information to restore the user data and the user interface state information in the current page of the web application.

18. The computer program product of claim 17, wherein the corresponding user interface state information comprises preprocessing state information and observer object information.

19. The computer program product of claim 18, wherein the capturing is performed in response to an occurrence of a pre-determined event.

20. The method of claim 19, wherein the restoring further comprises:

first using the captured user data to restore the user data in the web application, next using the preprocessing state information to restore one or more preprocessing methods, and finally using the observer object information to restore one or more observer object properties.

* * * * *